(12) United States Patent
Shenholz et al.

(10) Patent No.: US 8,431,841 B2
(45) Date of Patent: Apr. 30, 2013

(54) RANGEFINDER PIVOTABLE BETWEEN OBVERSE AND REVERSE POSITIONS

(75) Inventors: Gideon Shenholz, Tel Aviv (IL); Isaac Zloter, Holon (IL)

(73) Assignee: Pegasus Technologies Ltd., Azoor (IL)

( * ) Notice: Subject to any disclaimer, the term of this patent is extended or adjusted under 35 U.S.C. 154(b) by 1097 days.

(21) Appl. No.: 12/361,587

(22) Filed: Jan. 29, 2009

(65) Prior Publication Data

US 2010/0187421 A1 Jul. 29, 2010

(51) Int. Cl.
*G06F 3/043* (2006.01)

(52) U.S. Cl.
USPC .................................. 178/18.04; 178/18.03

(58) Field of Classification Search ............... 178/18.04
See application file for complete search history.

(56) References Cited

U.S. PATENT DOCUMENTS

| | | | | |
|---|---|---|---|---|
| 4,809,246 A * | 2/1989 | Jeng | .............. | 434/317 |
| 5,914,775 A * | 6/1999 | Hargrove et al. | ............ | 356/3.13 |
| 5,963,199 A * | 10/1999 | Kato et al. | .................... | 345/179 |
| 6,151,014 A * | 11/2000 | Zloter et al. | .................... | 345/177 |
| 6,262,662 B1 * | 7/2001 | Back et al. | ................. | 340/572.1 |
| 6,729,543 B1 * | 5/2004 | Arons et al. | ............ | 235/462.13 |
| 2002/0126110 A1 * | 9/2002 | Bowron | ...................... | 345/204 |
| 2005/0013104 A1 * | 1/2005 | Feague et al. | ........................ | 361/683 |
| 2005/0184159 A1 * | 8/2005 | Hattori et al. | ............ | 235/462.45 |
| 2009/0000830 A1 * | 1/2009 | Kim et al. | .................. | 178/18.03 |

* cited by examiner

*Primary Examiner* — Dorothy Harris
(74) *Attorney, Agent, or Firm* — Mark M. Friedman

(57) ABSTRACT

A rangefinder, for locating an object moving parallel to a planar surface, is rigidly attached to a carrier that is pivotably movable between an obverse position and a reverse position relative to a planar surface. Preferably, an orienting mechanism is provided for determining which position, obverse or reverse, the carrier and rangefinder are in. Preferably, a pivot, for pivoting the carrier and the rangefinder between the two positions, is rigidly attached either to the plane surface or to an attachment mechanism for reversibly attaching the carrier to the planar surface.

24 Claims, 11 Drawing Sheets

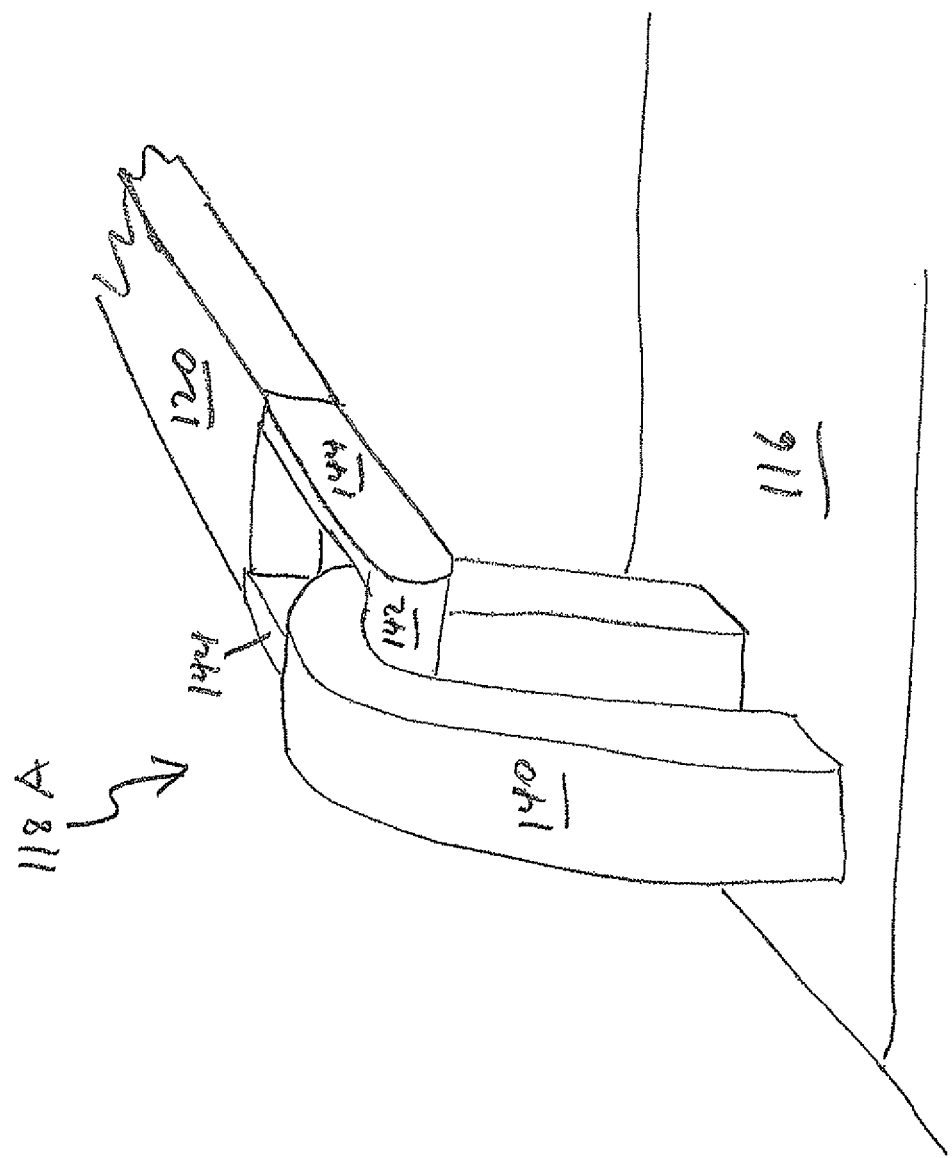

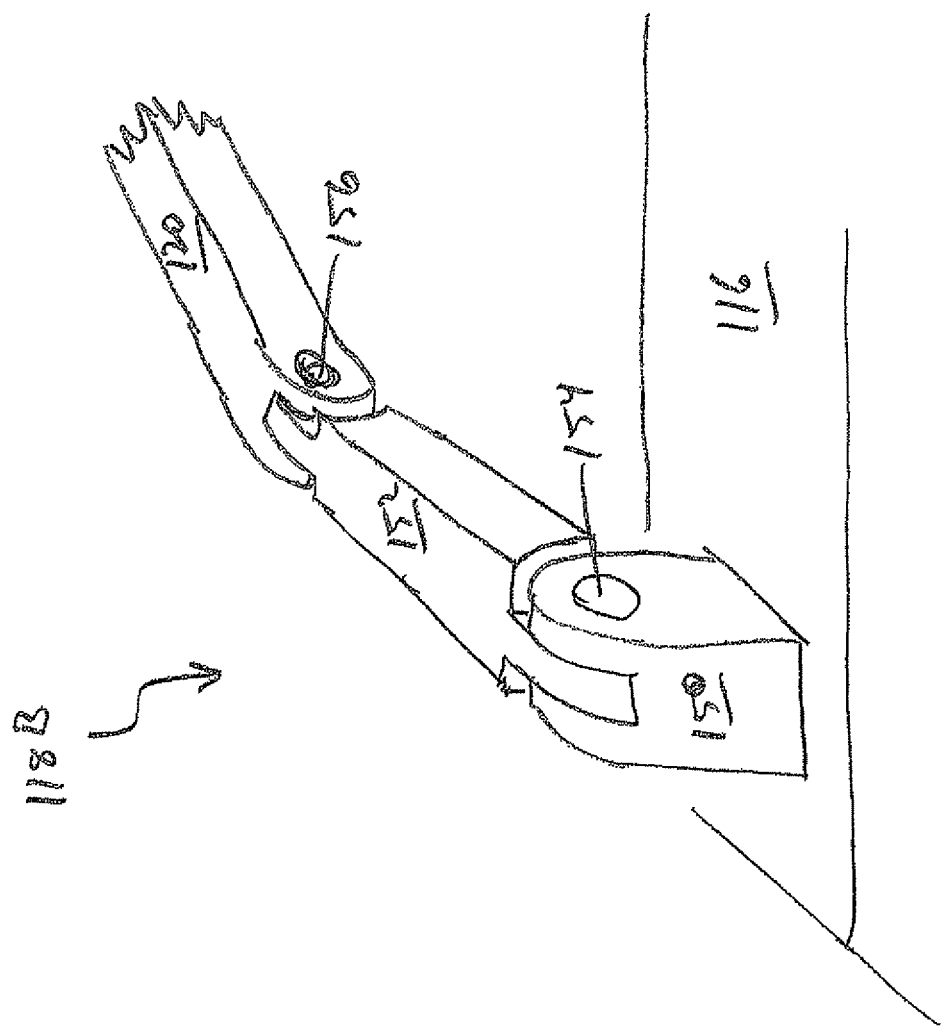

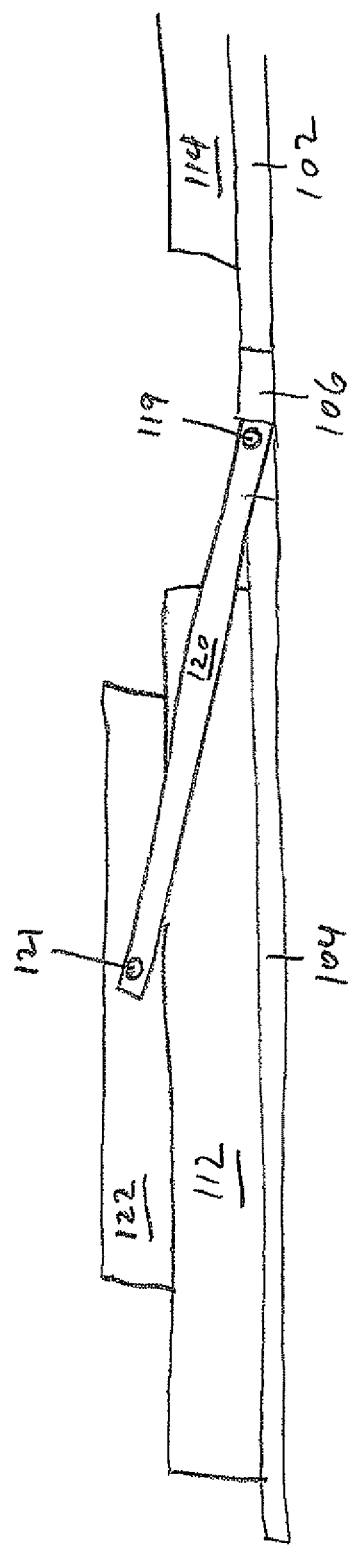

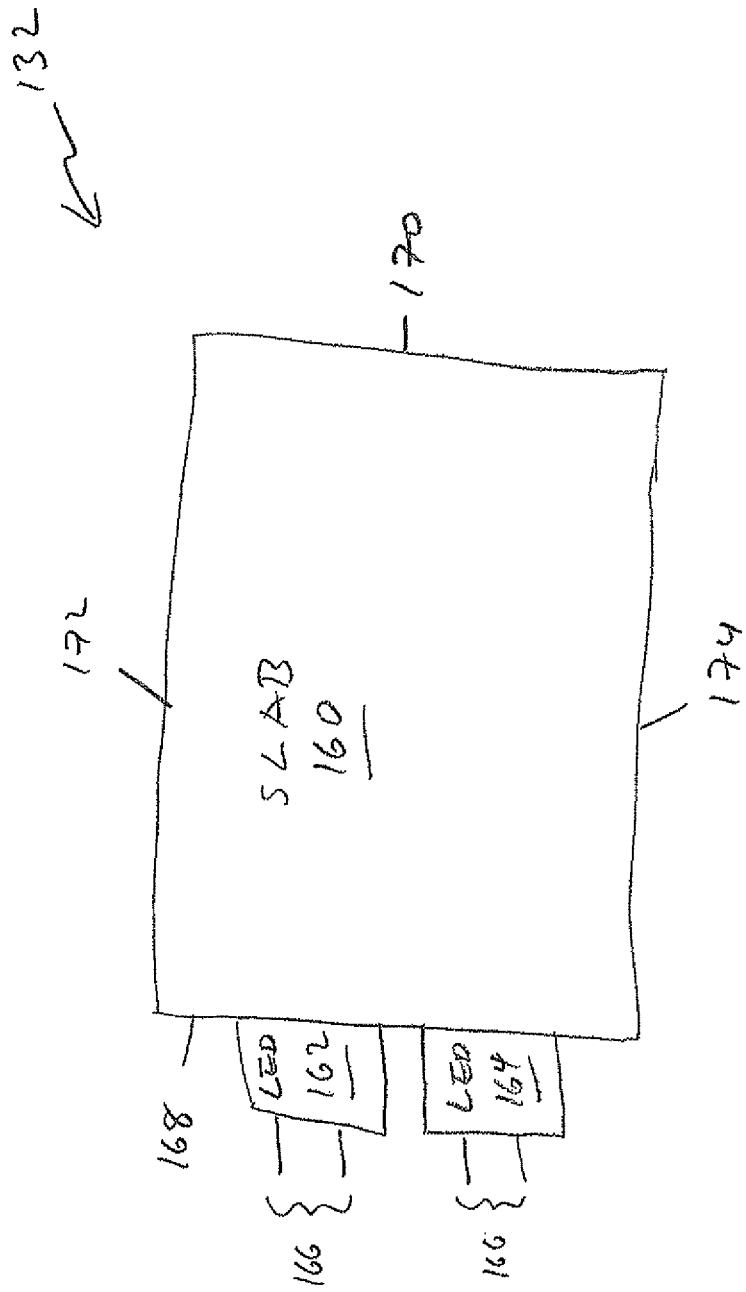

RANGEFINDER PIVOTABLE BETWEEN OBVERSE AND REVERSE POSITIONS

FIELD AND BACKGROUND OF THE INVENTION

The present invention relates to a rangefinder, e.g. for an electronic pen, and, more particularly, to a rangefinder and recorder, e.g. for an electronic pen, that records the user's handwriting continuously as the user moves from one page to the next.

FIG. 1 is a combined plan view and schematic block diagram of a combined rangefinder and recorder 10 for an electronic pen. On a lateral surface 14 of a housing 12 of rangefinder 10 are two spaced-apart ultrasound receivers 16 and an infrared receiver 18 that are operationally connected to rangefinding circuitry 20. Ultrasound receivers 16, infrared receiver 18 and rangefinding circuitry 20 operate in a manner that is taught e.g. in U.S. Pat. No. 6,151,014 to track the movement of an electronic pen (not shown) in the plane of FIG. 1. The pen periodically emits simultaneous omnidirectional infrared and ultrasound pulses. The infrared pulses are received by infrared receiver 18. The ultrasound pulses are received by ultrasound receivers 16. The time delays between the receptions of the individual infrared pulses and the associated individual ultrasound pulses, and the mutual time delays between the receptions of the individual ultrasound pulses at the two ultrasound receivers 16, are measured by rangefinding circuitry 20 and are used by rangefinding circuitry 20 to locate the pen relative to rangefinder 10 by triangulation. These measurements of the instantaneous location of the pen are sent by rangefinding circuitry 20 to recording/playback circuitry 22 that records the measurements in a flash memory 24 as a record of the handwriting of the user of the pen. Subsequent to the recording, the user may download the record of his/her handwriting from memory 24 via recording/playback circuitry 22 and a USB port 26. Power for circuitry 20 and 22 and for flash memory 24 is provided by a battery 28.

U.S. Pat. No. 6,151,014 is incorporated by reference for all purposes as if fully set forth herein.

In the system composed of rangefinder 10 and the electronic pen, the infrared pulses provide timing signals for timing the arrivals of the ultrasound pulses. In an alternate embodiment (not shown) the electronic pen is connected to rangefinder 10 by a waveguide such as a fiber optic cable and the infrared pulses are transmitted by the pen to the rangefinder via the waveguide. The waveguide is optically coupled to infrared receiver 18 and to the infrared transmitter of the pen. In yet another embodiment (also not shown), the electronic pen emits pulses of electrical voltage as timing pulses. The pulses of electrical voltage are conveyed to rangefinder 10 via flexible electrical conductors; and, instead of infrared receiver 18, rangefinder 10 is equipped with a detector of such pulses.

Rangefinder 10 may be secured e.g. by a clip to a pad of paper to allow the user to record his/her handwriting on the pad. One capability that is lacking in rangefinder 10 is the ability to automatically mark transitions from one sheet of paper to another. Such a capability, as well as others, is provided by the present invention.

SUMMARY OF THE INVENTION

According to the present invention there is provided a device including: (a) a rangefinder for locating an object moving parallel to a planar surface; and (b) a carrier, to which the rangefinder is rigidly attached, that is pivotably movable between an obverse position relative to the planar surface and a reverse position relative to the planar surface.

"Locating" an object means determining the position of the object relative to the rangefinder. Typically, the rangefinder locates the object by triangulation.

Preferably, the rangefinder is a passive rangefinder. A "passive" range finder is a rangefinder that does not transmit energy towards the object in order to locate the object. Typically, a "passive" rangefinder locates the object based on signals received from the object.

More preferably, the rangefinder includes a timing signal receiver (for example an infrared receiver or a detector of electrical voltage pulses) and two ultrasound receivers. Most preferably, the rangefinder includes circuitry for tracking an object, such as an electronic pen, that includes a timing signal transmitter and an ultrasound transmitter by locating the object based on timing signals received by the timing signal receiver from the timing signal transmitter and on ultrasound pulses received by the ultrasound receivers from the ultrasound transmitter. The timing signal receiver may receive the timing signals via free space or via a hardwired channel from the object. A "hardwired channel" is a (typically flexible) connector that connects the object to the rangefinder and that supports propagation of the timing signals. A typical example of such a hardwired channel is a fiber optic cable that supports the propagation of infrared timing signals. Another typical example of such a hardwired channel is a pair of flexible electrical conductors that support the propagation of electrical voltage timing signals.

Preferably, the device also includes an orienting mechanism for determining whether the rangefinder and the carrier are in the obverse position or in the reverse position. Most preferably, the device also comprises a pivot for pivoting the carrier and the rangefinder between the obverse position and the reverse position, and the orienting mechanism includes a mechanical switch that is operationally coupled to the pivot. Alternatively or additionally, the rangefinder has an obverse side and a reverse side, and the orienting mechanism includes one or more transmitters, an obverse receiver in the obverse side of the rangefinder, and a reverse receiver in the reverse side of the rangefinder. Alternatively or additionally, the orienting mechanism includes one or more proximity detectors for detecting proximity to a marker in the plane surface. In one embodiment, the proximity detector is a magnetometer, such as a Hall effect sensor, and the markers are asymmetrically placed permanent magnets. In another embodiment, the proximity detector is a metal detector, and the markers are asymmetrically placed pieces of metal.

Preferably, the device also includes the planar surface and a pivot. The pivot, that is rigidly attached to the planar surface, is for pivoting the carrier and the rangefinder between the obverse position and the reverse position. Most preferably, when the rangefinder is in either the obverse position or the reverse position, with a workpiece on the planar surface that has a distal surface that is substantially parallel to the planar surface and that has a workpiece thickness equal to at most a maximum thickness intervening between the rangefinder and the planar surface, the pivot allows the rangefinder to lie substantially flat on the distal surface.

Alternatively, the device also includes an attachment mechanism for reversibly attaching the carrier to the planar surface, and a pivot. The pivot, that is rigidly attached to the attachment mechanism, is for pivoting the carrier and the rangefinder between the obverse position and the reverse position while the carrier is attached to the planar surface. Most preferably, while the carrier is attached to the planar surface, when the rangefinder is in either the obverse position or the reverse position, with a workpiece on the planar surface that has a distal surface that is substantially parallel to the planar surface and that has a workpiece thickness equal to at most a maximum thickness intervening between the rangefinder and the planar surface, the pivot allows the rangefinder to lie substantially flat on the distal surface.

Preferably, the rangefinder includes an indicator light that is visible both when the rangefinder is in the obverse position and when the rangefinder is in the reverse position. More preferably, the rangefinder has an obverse side and a reverse side, and the indicator light includes a light source and a light propagation mechanism for directing light from the light source to emerge from both the obverse side of the rangefinder and the reverse side of the rangefinder. Most preferably, the light propagation mechanism includes a waveguide.

Preferably, the device also includes a folder that in turn includes a cover board and a base board. The cover board and the base board are reversibly movable, relative to each other, between an open configuration and a closed configuration. In the open configuration, a surface of the cover board and a surface of the base board define the planar surface that the object moves parallel to. In the closed configuration, the surface of the cover board faces the surface of the base board.

Most preferably, the device also includes an orienting mechanism for determining whether the folder is in the open configuration or in the closed configuration. When the folder is in the open configuration, the orienting mechanism also determines whether the rangefinder and the carrier are in the obverse position or in the reverse position.

BRIEF DESCRIPTION OF THE DRAWINGS

Various embodiments are herein described, by way of example only, with reference to the accompanying drawings, wherein:

FIGS. 3A and 4A are perspective views of two embodiments of the pivot of FIG. 2;

FIG. 5B is a partial side view of the folder of FIG. 5B;

FIG. 7 shows an indicator light of the rangefinder of FIG. 2;

FIG. 8 shows a rangefinder and recorder, for an electronic pen, attached to a clip.

DESCRIPTION OF THE PREFERRED EMBODIMENTS

The principles and operation of a rangefinder according to the present invention may be better understood with reference to the drawings and the accompanying description.

Figure 1:
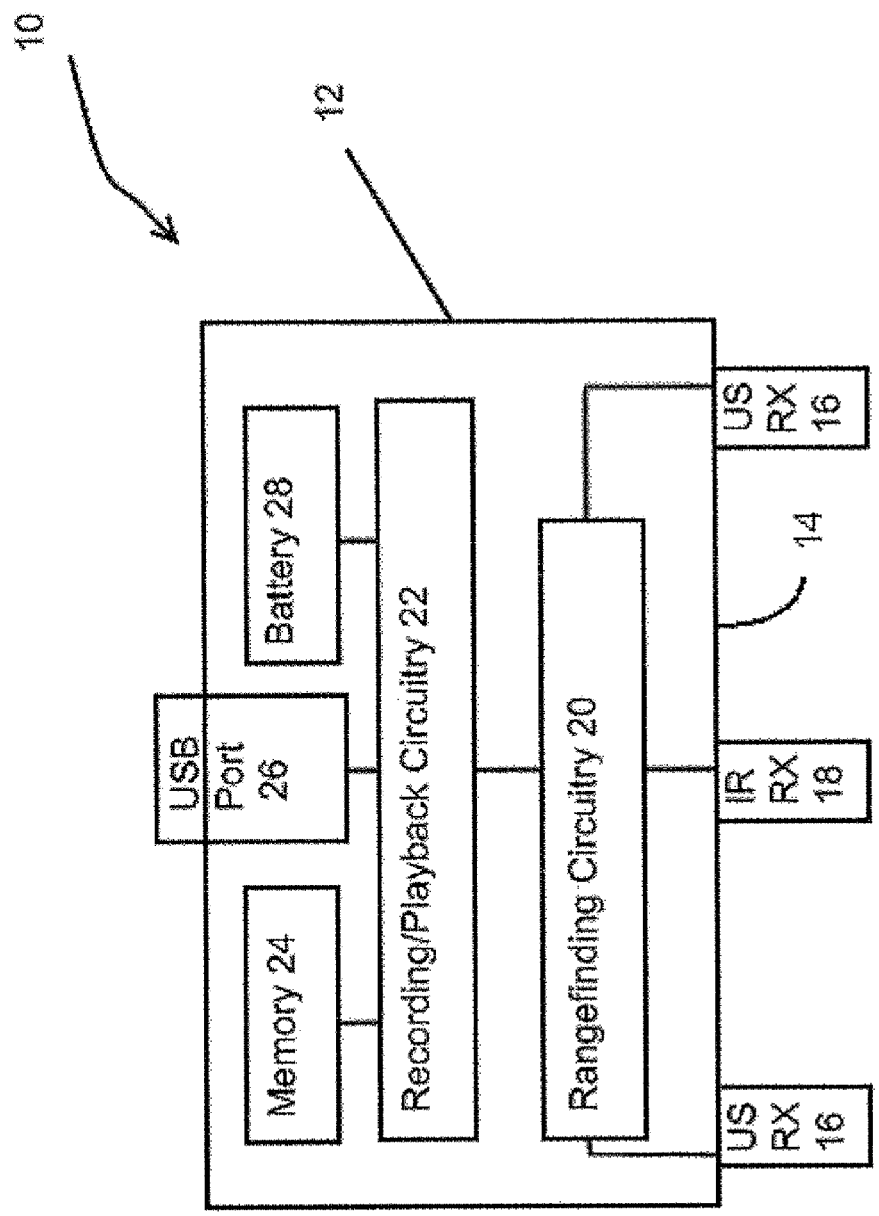
FIG. 1 is a combined plan view and schematic block diagram of a prior art combined rangefinder and recorder for an electronic pen.
Figure 2:
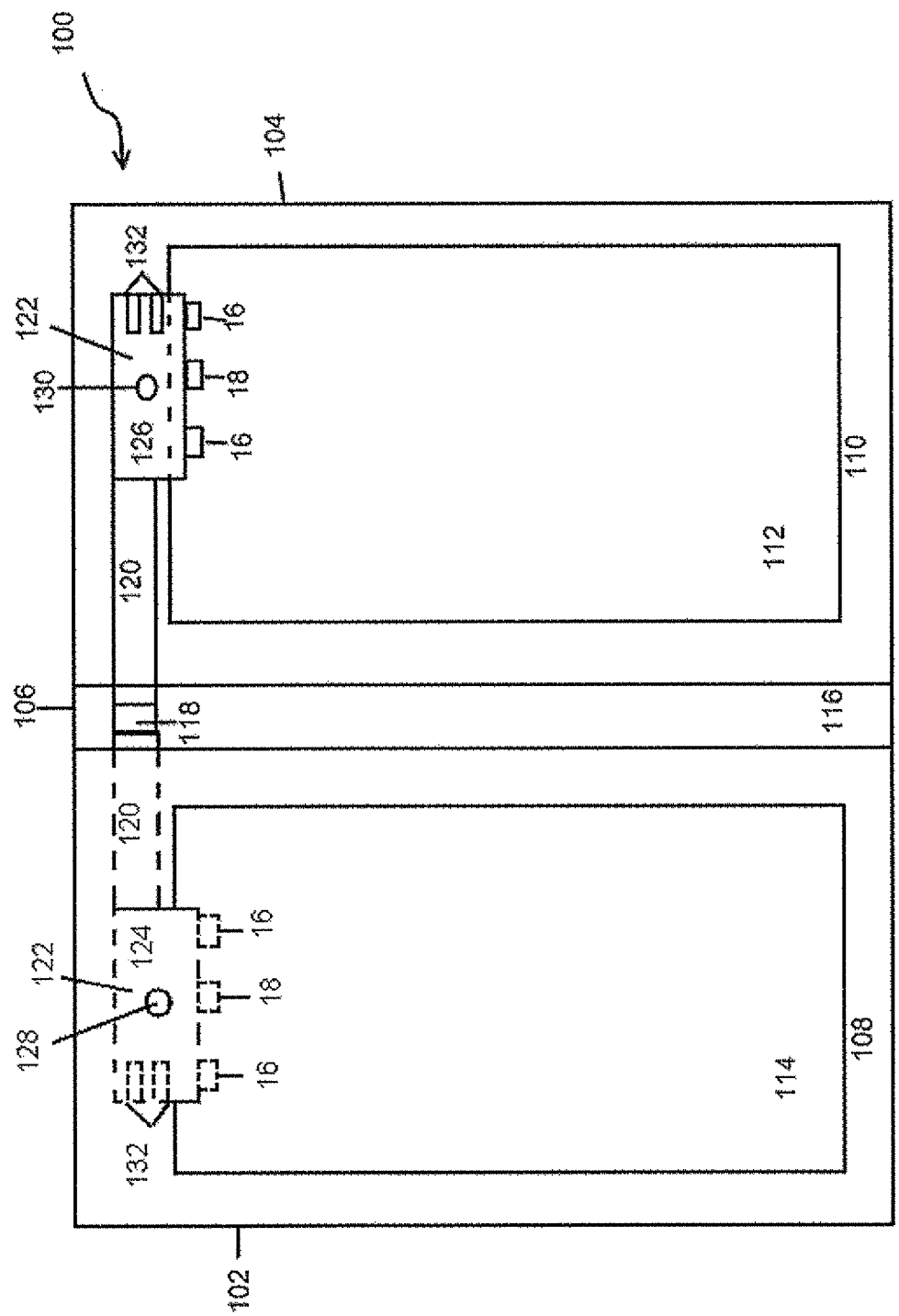
FIG. 2 is a plan view of a folder having attached thereto a combined rangefinder and recorder for an electronic pen.

Referring again to the drawings, FIG. 2 is a plan view of an open folder 100 having a cover board 102 and a base board 104 hinged to a spine 106. On the surface 110 of base board 104 is a stack 112 of writing paper. On the surface 108 of cover board 102 is a stack 114 of writing paper. Surfaces 108 and 110, in combination with the surface 116 of spine 106, define a joint planar surface of folder 100 when folder 100 is opened as shown. Rigidly attached to spine 106 is a pivot 118. A bar 120 is attached to pivot 118 in a manner that renders bar 120 pivotably attached to spine 106 via pivot 118. A combined rangefinder and recorder 122 of the present invention is rigidly attached to bar 120. Bar 120 and rangefinder 122 are drawn with solid lines to the right of spine 106 to show rangefinder 122 in an obverse position for recording a user's handwriting as the user writes on stack 112, and with dashed lines to the left of spine 106 to show rangefinder 122 in a reverse position for recording a user's handwriting as the user writes on stack 114.

Pivot 118 allows a user to pivot rangefinder 122 between the obverse position on stack 112 and the reverse position on stack 114. When rangefinder 122 is in the obverse position, an obverse side 124 of rangefinder 122 faces down to stack 112 and so is invisible, and a reverse side 126 of rangefinder 122 faces up and so is visible. When rangefinder 122 is in the reverse position, reverse side 126 of rangefinder 122 faces down to stack 114 and so is invisible, and obverse side 124 of rangefinder 122 faces up and so is visible.

Rangefinder 122 inherits from rangefinder 10 ultrasound receivers 16, infrared receiver 18 and the associated internal components of rangefinder 10, except that the recording and playback circuitry of rangefinder 122 is enhanced to support the functionality of rangefinder 122 that is described below. (How to modify recording and playback circuitry 22 to support the enhanced functionality of rangefinder 122 relative to rangefinder 10 will be clear to those skilled in the art and need not be described explicitly.) For example, rangefinder 122 includes an obverse infrared transceiver (transmitter+receiver) 128 in obverse side 124 and a reverse infrared transceiver (transmitter+receiver) 130 in reverse side 126. Rangefinder 122 also includes several indicator lights 132 for indicating to the user the state of rangefinder 122. For example, one of indicator lights 132 can be unlit when rangefinder 122 is powered down, green when rangefinder 122 is powered up, and red when the battery of rangefinder 122 is low in power.

Transceivers 128 and 130 are operationally connected to the recording and playback circuitry of rangefinder 122. Each transceiver 128 and 130 periodically emits an infrared pulse and waits a suitably short amount of time to detect a corresponding infrared reflection. When rangefinder 122 is in the obverse position, transceiver 128 detects reflections from stack 112 and transceiver 130 does not detect reflections. When rangefinder 122 is in the reverse position, transceiver 130 detects reflections from stack 114 and transceiver 128 does not detect reflections. While rangefinder 122 is being pivoted from the obverse position to the reverse position or from the reverse position to the obverse position, neither transceiver 128 detects reflections.

Initially, there is writing paper in stack 112 and stack 114 is absent. Rangefinder 122 is in the obverse position. The user writes on the top sheet of stack 112 with an electronic pen. The recording and playback circuitry of rangefinder 122 receives an indication from transceiver 128 that transceiver 128 is detecting reflections and an indication from transceiver 130 that transceiver 130 is not detecting reflections. These indications tell the recording and playback circuitry of rangefinder 122 that rangefinder 122 is in the obverse position. Rangefinder 122 tracks the location of the electronic pen in the manner of rangefinder 10 and records the motion of the electronic pen as a record of the handwriting of the user on the obverse side of the top sheet. When the user finishes writing on the obverse side of the top sheet of stack 112, the user pivots bar 120 and rangefinder 122 to a position in which bar 120 is perpendicular to surfaces 108, 110 and 116. Both transceivers 128 and 130 send indications to the recording and playback circuitry of rangefinder 122 that transceivers 128 and 130 are not detecting reflections. These indications tell the recording and playback circuitry of rangefinder 122 that rangefinder 122 is transiting from the obverse position to the reverse position. Consequently, the recording and playback circuitry of rangefinder 122 records an obverse-to-reverse page break. The user turns the sheet over and places the sheet on surface 108, thereby initiating stack 114. The user completes the pivoting of rangefinder 122 to the reverse position. When rangefinder 122 reaches stack 114, the recording and playback circuitry of rangefinder 122 receives an indication from transceiver 128 that transceiver 128 is not detecting reflections and an indication from transceiver 130 that transceiver 130 is detecting reflections. These indications tell the recording and playback circuitry of rangefinder 122 that rangefinder 122 is in the reverse position. Rangefinder 122 resumes tracking the location of the electronic pen in the manner of rangefinder 10 and records the motion of the electronic pen as a record of the handwriting of the user on the reverse side of the top sheet. When the user finishes writing on the reverse side of the former top sheet of stack 112, the user pivots bar 120 and rangefinder 122 back to the position in which bar 120 is perpendicular to surfaces 108, 110 and 116. Both transceivers 128 and 130 send indications to the recording and playback circuitry of rangefinder 122 that transceivers 128 and 130 are not detecting reflections. These indications tell the recording and playback circuitry of rangefinder 122 that rangefinder 122 is transiting from the reverse position to the obverse position. Consequently, the recording and playback circuitry of rangefinder 122 records a reverse-to-obverse page break. The user returns range finder 122 to the obverse position, on the second sheet of stack 112, and continues writing on the obverse side of the second sheet of stack 112, while rangefinder 122 resumes tracking the electronic pen and recording the user's handwriting. Use of folder 100 continues in this manner, with rangefinder 122 recording the user's handwriting on the obverse and reverse sides of the sheets of paper while inserting directional (obverse-to-reverse or reverse-to-obverse) page breaks as needed, until the user finishes writing.

When the user finishes writing, the user closes folder 100 so that surface 108 and stack 114 face surface 110 and stack 112. The recording and playback circuitry of rangefinder 122 receives indications from both transceivers 128 and 130 that both transceivers 128 and 130 are receiving reflections. Consequently, recording and playback circuitry powers down rangefinder 122 into sleep mode to conserve battery power. When the user again opens folder 100, the recording and playback circuitry of rangefinder 122 receives indications from one or both of transceivers 128 and 130 that the transceiver is not receiving reflections, and consequently powers up rangefinder 122.

Figure 3B:
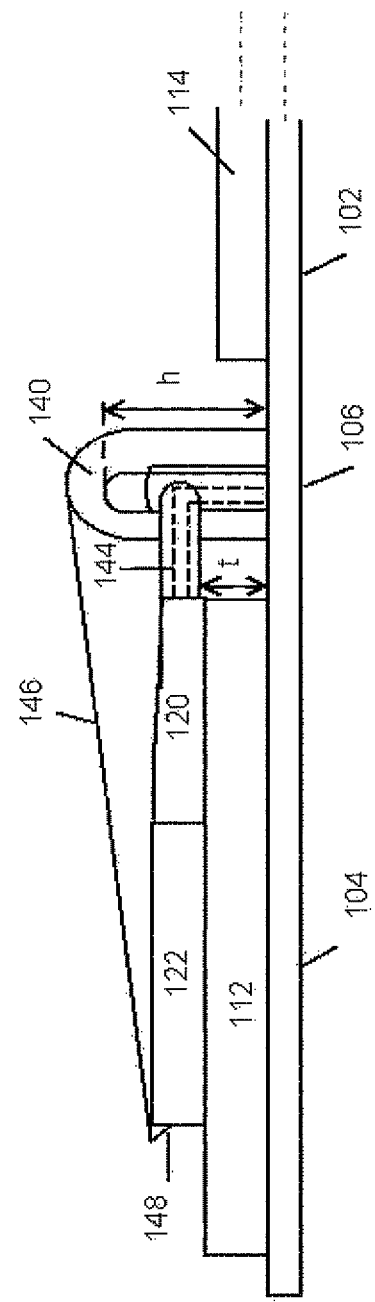
FIGS. 3B and 4B are partial side views of folders with the pivots of FIGS. 3A and 4A.
Figure 4B:
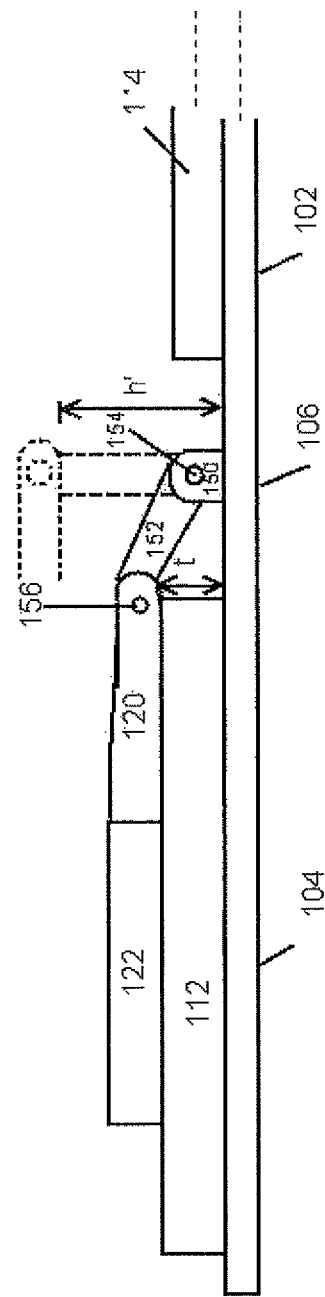

Pivot 118 is structured so that rangefinder 122 lies flat on stack 112 when rangefinder 122 is in the obverse position and so that rangefinder 122 lies flat on stack 114 when rangefinder 122 is in the reverse position, as long as stack 112 or 114 is not too thick. FIG. 3A shows, in perspective view, one embodiment of pivot 118, a pivot 118A, that is so structured. Pivot 118A includes an arch 140 through which runs a pin 142 that is rigidly connected by two connecting rods 144 to bar 120. FIG. 3B is a partial side view of a folder 100 whose pivot 118 is such a pivot 118A, showing that rangefinder 122 lies flat on stack 112 when the thickness t of stack 112 is less than or approximately equal to a height h that is equal to the interior height of arch 140 minus the thickness of pin 142. FIG. 4A shows, in perspective view, another such embodiment 118B of pivot 118. Pivot 118B is a mechanical linkage between spine 106 and bar 120 that includes an upright 150, an arm 152 and two revolute joints 154 and 156. FIG. 4B is a partial side view of a folder 100 whose pivot 118 is such a pivot 118B, showing that rangefinder 122 lies flat on stack 112 when the thickness t of stack 112 is less than or approximately equal to a height h' that is the distance from surface 116 of spine 106 to bar 120 when arm 154 is perpendicular to spine 106 (as shown in phantom).

Figure 5A:
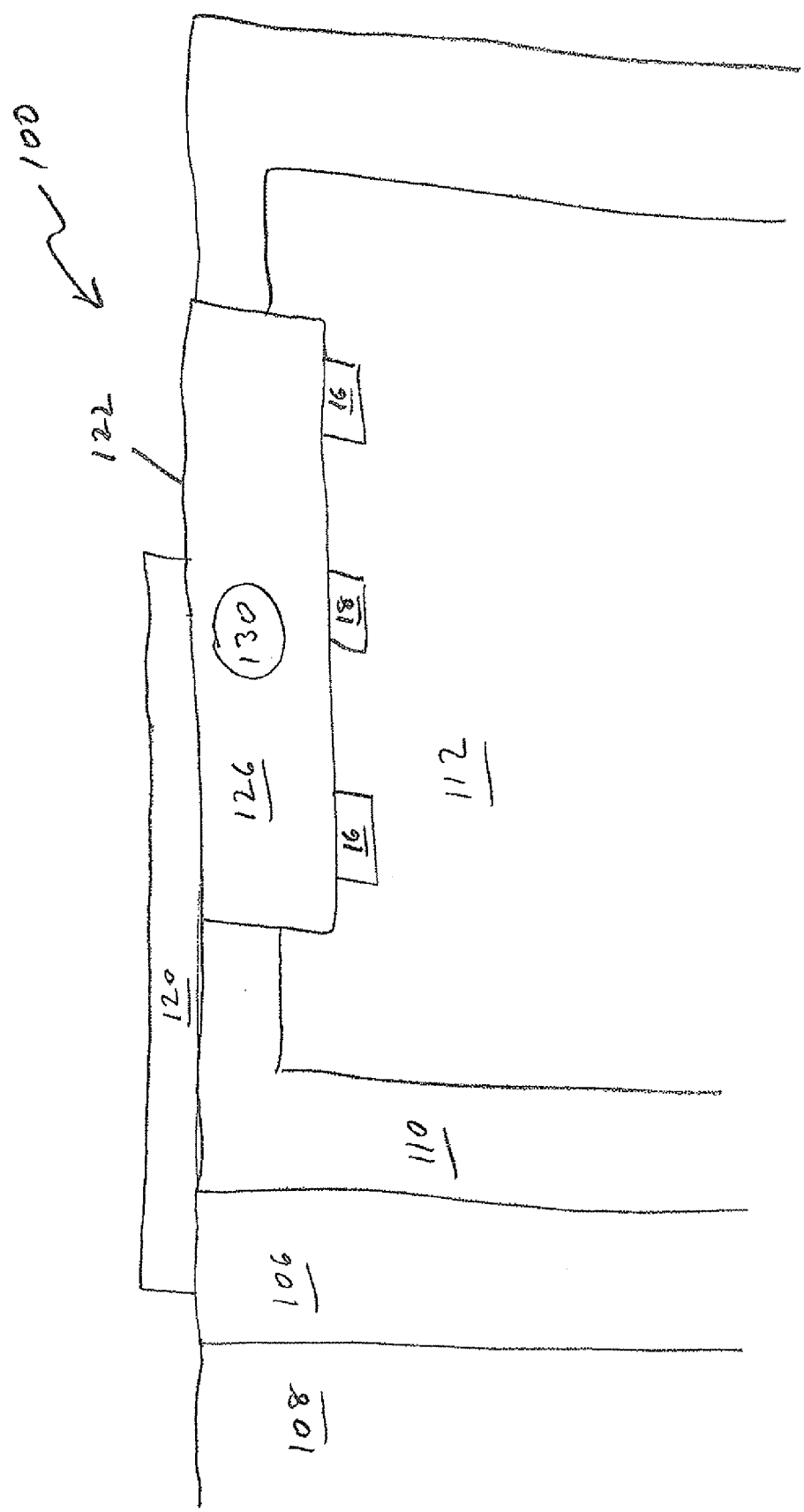
FIG. 5A is a partial plan view of an alternate embodiment of the folder of FIG. 2.

FIG. 5A is a partial plan view, and FIG. 5B is a partial side view, of an alternate embodiment of folder 100. In this alternate embodiment, bar 120, instead of being rigidly attached to rangefinder 122, is pivotably attached to a lateral surface of rangefinder 122 by a revolute joint 121. Instead of being pivotably attached to a pivot on surface 116 of spine 106, the other end of bar 120 is pivotably attached to a lateral surface of spine 106 by a revolute joint 119.

FIG. 3B also shows a first alternative mechanism, instead of transceivers 128 and 130, for sensing whether rangefinder 122 is in the obverse position or the reverse position. One end of a cable 146 is secured to the side of arch 140 that faces cover board 102. The other end of cable 146 is secured to a spring-loaded switch 148 on the distal side of rangefinder 122. When rangefinder 122 is in the obverse position, as shown in FIG. 3B, cable 146 pulls switch 148 to a position that indicates to the recording and playback circuitry of rangefinder 122 that rangefinder 122 is in the obverse position. When rangefinder 122 is in the reverse position, cable 146 relaxes and the spring in switch 148 pulls switch 148 to a position that indicates to the recording and playback circuitry of rangefinder 122 that rangefinder 122 is in the reverse position. Cable 146 and switch 148 are shown outside bar 120 and rangefinder 122 only for illustrational clarity. In practice, cable 146 is threaded through bar 120 and rangefinder 122, and switch 148 is inside rangefinder 122.

Figure 6:
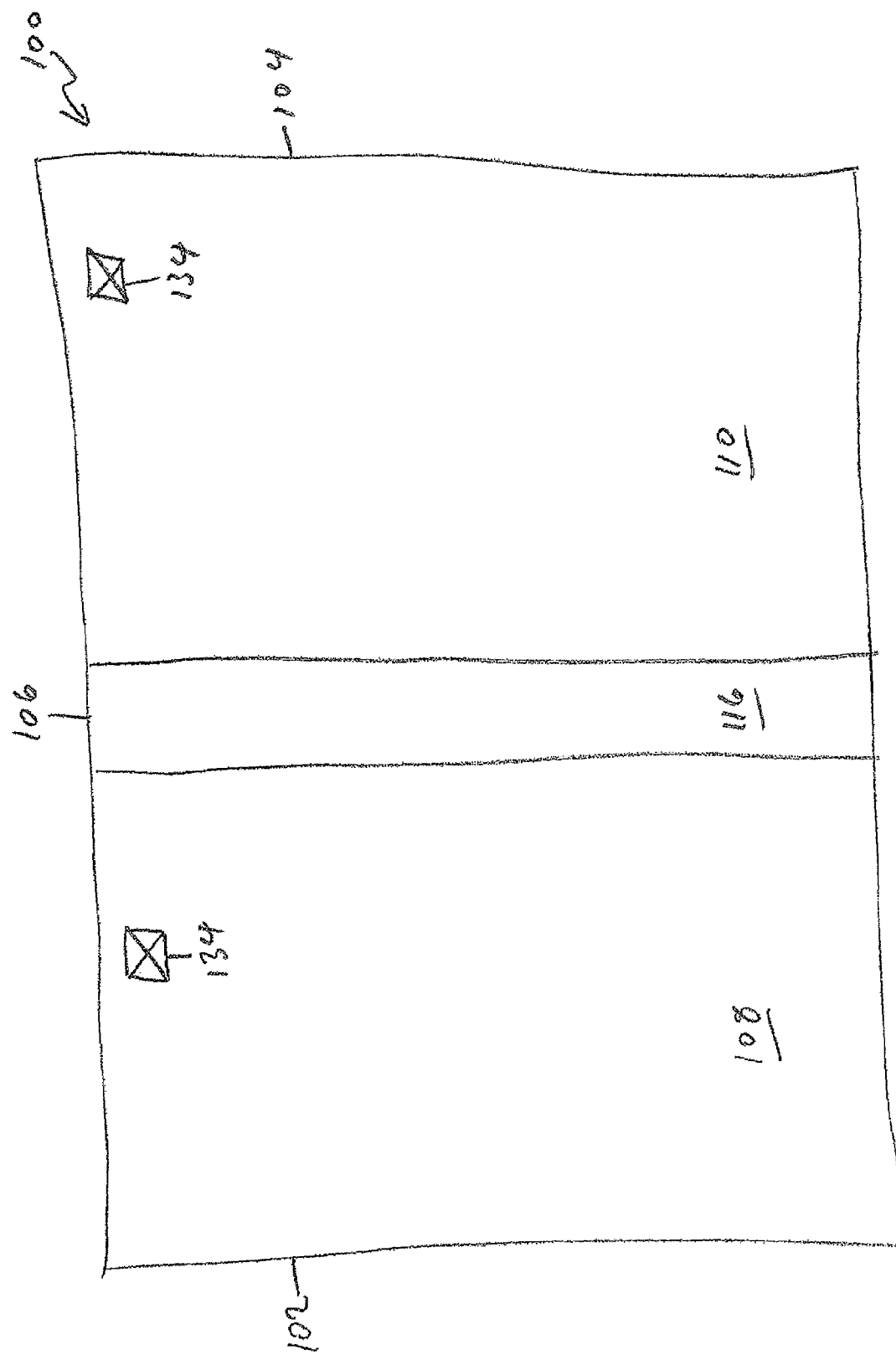
FIG. 6 illustrates mechanisms for sensing whether the rangefinder of FIG. 2 is in the obverse position or in the reverse position.
Figure 6:
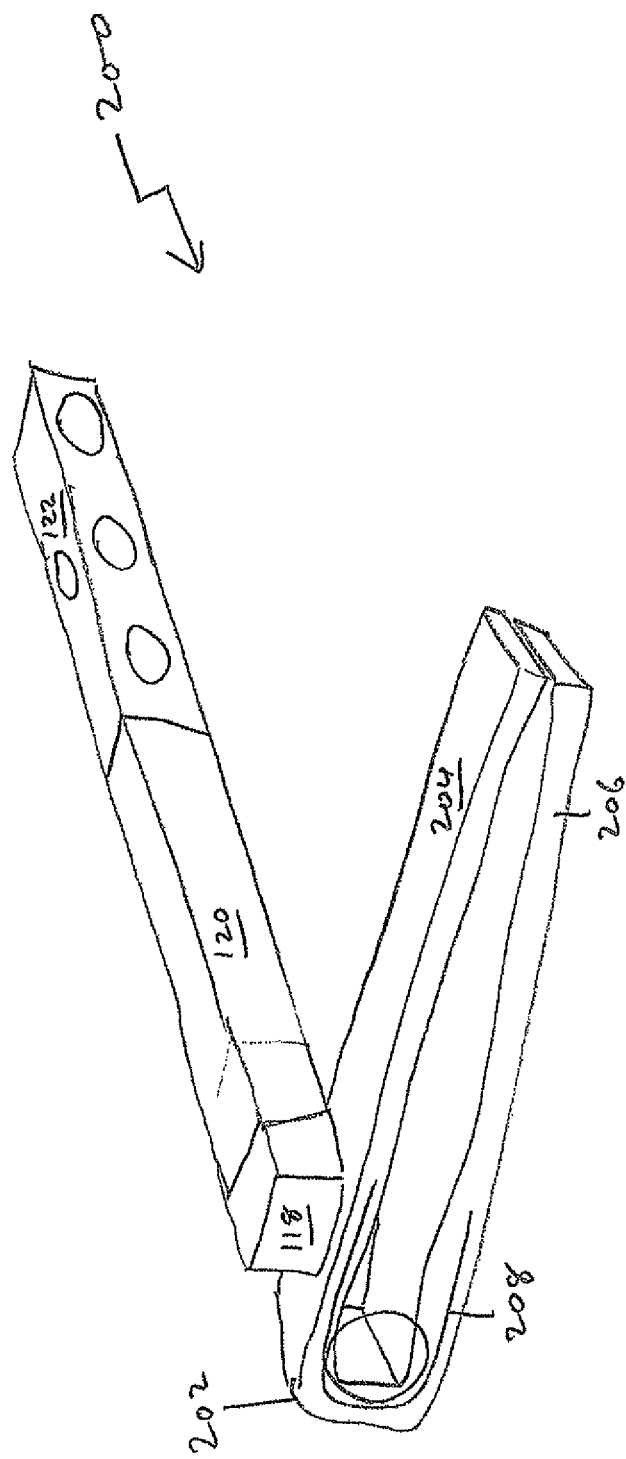

Second and third alternative mechanisms, instead of transceivers 128 and 130, for sensing whether rangefinder 122 is in the obverse position or the reverse position, are illustrated in FIG. 6. Two markers 134 are disposed asymmetrically towards the top of folder 100, one marker 134 in cover board 102 and the other marker 134 in base board 104. Rangefinder 122 includes a sensor that is sensitive to the proximity of the material of which markers 134 is composed. In the second alternative mechanism, markers 134 are permanent magnets and the sensor is a magnetometer such as a Hall effect sensor. In the third alternative mechanism, markers 134 are metallic and the sensor is a metal detector.

FIG. 7 shows an indicator light 132. Indicator light 132 is a parallelipipedal slab 160 of a transparent material with a relatively high index of refraction for visible light. A green light emitting diode (LED) 162 and a red LED 164 are optically coupled to slab 160 at its interior edge 168. The housing of rangefinder 122 is slotted at its distal end to accommodate indicator lights 132 with their distal edges 170 flush with the distal side of rangefinder 122, with their obverse edges 172 flush with obverse side 124 of rangefinder 122, and with their reverse edges 174 flush with reverse side 126 of rangefinder 122. Indicator lights 132 are separated within rangefinder 122 by air gaps, so that slabs 160 act as waveguides; most of the light injected into slabs 160 at edges 168 by LEDs 162 and 164 is reflected internally in slabs 160 and emerges at edges 170, 172 and 174. Therefore, a user can see light emerging from indicator lights 132 whether rangefinder 122 is in its obverse position or rangefinder 122 is in its reverse position.

FIG. 8 shows, in schematic perspective view, an alternative embodiment 200 that combines pivot 118, bar 120 and rangefinder 122 with a clip 202 made of a resiliently elastic material. Clip 202 includes two jaws 204 and 206 biased together by a spring 208. In embodiment 200, pivot 118 is rigidly attached to upper jaw 204, just as pivot 118 is rigidly attached to spine 106 in the embodiment of FIG. 2. Note that in both FIG. 2 and FIG. 8, pivot 118 is represented schematically, and could be configured mechanically as pivot 118A of FIGS. 3A and 3B, or as pivot 118B of FIGS. 4A and 4B, or in any other suitable manner. Embodiment 200 is intended for use with folders that include just cover board 102, base board 104 and spine 106. Clip 202 is used to clip embodiment 200 reversibly to spine 106 of one of these folders. While embodiment 200 is clipped to the folder, rangefinder 122 is pivotable between an obverse position and a reverse position relative to the folder and is used just as in the single-folder embodiment of FIG. 2. Embodiment 200 may be transferred by the user from one folder to another.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A device comprising:
   (a) a rangefinder for locating an object moving parallel to a planar surface; and
   (b) a carrier, to which said rangefinder is rigidly attached, that is pivotably movable between an obverse position relative to said planar surface and a reverse position relative to said planar surface.

2. The device of claim 1, wherein said rangefinder is a passive rangefinder.

3. The device of claim 2, wherein said rangefinder includes a timing signal receiver and two ultrasound receivers.

4. The device of claim 3, wherein said timing signal receiver is an infrared receiver.

5. The device of claim 3, wherein said rangefinder includes circuitry for tracking an object that includes a timing signal transmitter and an ultrasound transmitter by locating said object based on timing signals received by said timing signal receiver from said timing signal transmitter and on ultrasound pulses received by said ultrasound receivers from said ultrasound transmitter.

6. The device of claim 5, wherein said timing signal receiver receives said timing signals via free space.

7. The device of claim 5, wherein said timing signal receiver receives said timing signals via a hardwired channel from said object.

8. The device of claim 5, wherein said object is an electronic pen.

9. The device of claim 1, wherein said device further comprises:
   (c) an orienting mechanism for determining whether said rangefinder and said carrier are in said obverse position or in said reverse position.

10. The device of claim 9, wherein said device further comprises:
    (d) a pivot for pivoting said carrier and said rangefinder between said obverse position and said reverse position; and wherein said orienting mechanism includes a mechanical switch that is operationally coupled to said pivot.

11. The device of claim 9, wherein said rangefinder has an obverse side and a reverse side and wherein said orienting mechanism includes:
    (i) at least one transmitter;
    (ii) an obverse receiver in said obverse side of said rangefinder; and
    (iii) a reverse receiver in said reverse side of said rangefinder.

12. The device of claim 9, wherein said orienting mechanism includes at least one proximity detector for detecting proximity to a marker in said planar surface.

13. The device of claim 12, wherein said proximity detector is a magnetometer.

14. The device of claim 13, wherein said magnetometer is a Hall effect sensor.

15. The device of claim 12, wherein said proximity detector is a metal detector.

16. The device of claim 1, further comprising:
    (c) said planar surface; and
    (d) a pivot, that is rigidly attached to said planar surface, for pivoting said carrier and said rangefinder between said obverse position and said reverse position.

17. The device of claim 16, wherein, when said rangefinder is in said obverse position or in said reverse position, with a workpiece on said planar surface having a distal surface that is substantially parallel to said planar surface and a workpiece thickness equal to at most a maximum thickness intervening between said rangefinder and said planar surface, said pivot allows said rangefinder to lie substantially flat on said distal surface.

18. The device of claim 1, further comprising:
    (c) an attachment mechanism for reversibly attaching said carrier to said planar surface; and
    (d) a pivot, that is rigidly attached to said attachment mechanism, for pivoting said carrier and said rangefinder between said obverse position and said reverse position.

19. The device of claim 18, wherein, when said rangefinder is in said obverse position or in said reverse position, with a workpiece on said planar surface having a distal surface that is substantially parallel to said planar surface and a workpiece thickness equal to at most a maximum thickness intervening between said rangefinder and said planar surface, said pivot allows said rangefinder to lie substantially flat on said distal surface.

20. The device of claim 1, wherein said rangefinder includes an indicator light that is visible both when said rangefinder is in said obverse position and when said rangefinder is in said reverse position.

21. The device of claim 20, wherein said rangefinder has an obverse side and a reverse side and wherein said indicator light includes:
    (i) a light source; and
    (ii) a light propagation mechanism for directing light from said light source to emerge from both said obverse side and said reverse side.

22. The device of claim 21, wherein said mechanism includes a waveguide.

23. The device of claim 1, further comprising:
    (c) a folder that includes a cover board and a base board that are reversibly movable relative to each other between:
        (i) an open configuration in which a surface of said cover board and a surface of said base board define said planar surface, and
        (ii) a closed configuration in which said surface of said cover board faces said surface of said base board.

24. The device of claim 23, further comprising:
    (d) an orienting mechanism for determining:
        (i) whether said folder is in said open configuration or in said closed configuration, and (ii) when said folder is in said open configuration: whether said rangefinder and said carrier are in said obverse position or in said reverse position.

* * * * *